(12) United States Patent
Wigström

(10) Patent No.: US 6,367,728 B1
(45) Date of Patent: Apr. 9, 2002

(54) BELT WINDING DEVICE/BELT TENSIONER COMBINATION WITH SEPARABLE BELT TENSIONER DRIVE

(75) Inventor: Fredrik Wigström, Floda/Scweden (SE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/569,387

(22) Filed: May 11, 2000

(30) Foreign Application Priority Data

May 11, 1999 (DE) .......................... 199 21 809

(51) Int. Cl.7 .......................... B60R 22/28; B60R 22/46
(52) U.S. Cl. ...................... 242/374; 242/379.1
(58) Field of Search .................. 242/374, 379.1; 280/806; 297/478

(56) References Cited

U.S. PATENT DOCUMENTS

| | | | | |
|---|---|---|---|---|
| 5,522,564 A | * | 6/1996 | Schmidt et al. | 242/374 |
| 5,895,002 A | * | 4/1999 | Sasaki et al. | 242/374 |
| 5,938,135 A | * | 8/1999 | Sasaki et al. | 242/374 |
| 6,105,893 A | * | 8/2000 | Schmidt et al. | 242/374 |

* cited by examiner

Primary Examiner—John M. Jillions
(74) Attorney, Agent, or Firm—R. W. Becker & Associates; R. W. Becker

(57) ABSTRACT

A safety belt winding device is provided having a tensioning mechanism with a cable that can be unwound from a pulley, and also having a force-limiting device for a predetermined belt withdrawal, wherein the connection between the belt winding shaft and the tensioning mechanism is adapted to be eliminated after conclusion of the tensioning movement. A retaining element is disposed on an end of the cable and is releasably fixed in position on the pulley, wherein an ejection arm is mounted on the pulley such that it can be pivoted out radially and that during a tensioning process in a belt winding direction is held in a pivoted-in position by the housing in which the pulley is accommodated. During rotation of the belt winding shaft in the belt withdrawal direction, the ejection arm pivots outwardly and is fixed from further rotation via a configuration of the housing and thereby displaces the retainer element of the cable out of engagement with the housing.

6 Claims, 2 Drawing Sheets

BELT WINDING DEVICE/BELT TENSIONER COMBINATION WITH SEPARABLE BELT TENSIONER DRIVE

BACKGROUND OF THE INVENTION

The present invention relates to a safety belt reeling or winding device having a tensioning mechanism that acts on a belt winding shaft and that is provided with a drive means, wherein upon initiation the tensioning mechanism is adapted to be coupled via a tensioner coupling with the belt winding shaft. The belt winding device is furthermore provided with a force-limiting device for a predetermined belt withdrawal, wherein the connection between the belt winding shaft and the tensioning mechanism is adapted to be eliminated after conclusion of a tensioning movement acting in a winding direction of the belt. The tensioning mechanism has a driving cable that is adapted to be unwound from a cable pulley that is adapted to be coupled to the belt winding shaft.

Such a belt winding device can be embodied not only as a self-blocking belt winding device that is equipped with a blocking device that is activated in a vehicle-sensitive and/or belt-sensitive manner, but also as a so-called end or limit fitting tensioner that tensions components held on the belt and after conclusion of the tensioning process fixes the position thereof.

The safety belt winding device of the aforementioned general type and embodied as a self-blocking belt winding device is disclosed in U.S. Pat. No. 5,522,564. To the extent that the known safety belt winding device has a force-limiting device, after conclusion of the tensioning process, accompanied by the absorption of energy, the force-limiting device permits a limited movement of the strapped-in passenger in order to dampen belt forces that act upon the body of the passenger. To the extent that in this connection a rotation of the belt winding shaft in the belt withdrawal direction occurs, this rotation returns the drive apparatus of the tensioning device to its starting position. If in this connection there is not available sufficient length of the cable of the tensioning device, the force-limiting device, i.e. the predetermined movement, cannot be fully utilized. Therefore, the known safety belt winding device already provides for elimination of the connection between the belt winding shaft and the tensioning device upon conclusion of the tensioning movement, so that a reverse rotation of the belt winding shaft in the belt withdrawal direction counter to the tension direction is possible over a greater path. For this purpose, U.S. Pat. No. 5,522,564 describes various proposals such as cutting the driving cable or uncoupling the cable pulley from the belt winding shaft.

It is an object of the present invention, for a safety belt winding device having the aforementioned features, to provide for a straightforward and reliably operating separation of the belt winding shaft from the tensioning mechanism.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
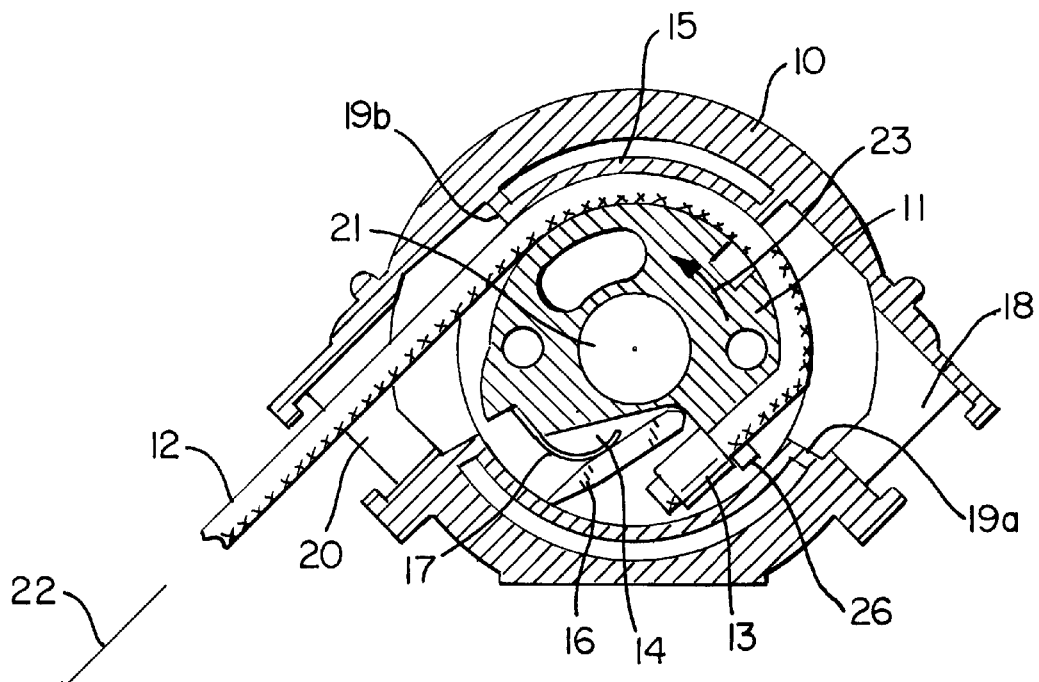
FIG. 1 is a schematic side view of one exemplary embodiment of the inventive arrangement showing a cable pulley, with the driving cable mounted therein, and surrounded by a housing, prior to start of the tensioning movement.

The safety belt winding device of the present invention is characterized primarily in that the driving cable, by means of a holding element disposed on an associated end thereof, is releasably fixed in position on the cable pulley, wherein an ejection arm is mounted on the pulley such that it can be pivoted out radially and that during a tensioning process in the belt winding direction such ejection arm is held in its pivoted-in position by a housing whereupon during rotation of the belt winding shaft in the belt withdrawal direction, the ejection arm pivots outwardly and is fixed from further rotation via a configuration of the housing and thereby displaces the retainer element of the driving cable out of engagement with the pulley.

The present invention provides an apparatus of straightforward construction that is easy to manufacture, whereby with the exception of the cable grommet that is to be disposed on the driving cable, the required structures are realized on the cable pulley and on the housing. Since merely the rotation of the pulley in the housing that surrounds it is utilized for the control, malfunctions are to a large extent precluded.

Pursuant to one specific embodiment of the present invention, the retainer element that serves as a holding means for the driving cable is hooked into a recess of the cable pulley, and also disposed in the recess is the ejection arm, which during its pivoting-out movement acts directly upon the retainer element.

Pursuant to another specific embodiment of the invention, the end portion of the driving cable can be fixed in its position where it is fixed on the cable by means of projections that are sheared off during the radial deflection of the retainer element.

To assist the pivoting-out movement of the ejection arm, this arm can be biased in its radial pivoting-out direction by means of a spring. In addition, the housing can have at least one opening that enables not only the radial pivoting-out movement of the ejection arm, but also the release of the retainer element from the recess of the cable pulley.

Further specific features of the present invention will be described in detail subsequently.

DESCRIPTION OF PREFERRED EMBODIMENTS

Referring now to the drawings in detail, it should be noted that these drawings are limited to those features that are necessary for an understanding of the present invention. For a description of the construction and function of the overall belt winding device/belt tensioner combination with a force-limiting device, reference is made to the disclosure of the aforementioned document U.S. Pat. No. 5,522,564, which is hereby incorporated herein by this reference thereto.

Rotatably mounted on the end of a belt winding shaft 21 is a cable pulley 11 that in the event of triggering or initiation of the tensioning mechanism is adapted to be coupled with the belt winding shaft 21 via a non-illustrated coupling. The appropriately configured coupling, along with the cable pulley 11, are surrounded by a housing 10. A driving cable 12 is wound onto the pulley 11, possibly in a plurality of windings. That end of the cable 12 that is to be connected to the pulley 11 is provided with a retainer element 13 that is hooked on the edge of a recess 14 formed in the pulley 11. The housing 10 is provided with guide members 15 for guiding the cable 12 along the pulley 11, wherein the cable 12 is guided into the housing 10 via an opening 20. The end portion of the cable 12, with the retainer element 13 secured thereon, is fixed in its position of engagement on the pulley 11 by projections 26 that are sheared off when subjected to stress.

An ejection arm 16 is mounted in the recess 14 of the cable pulley 11 in such a way that this arm 16 can be radially pivoted out beyond the periphery of the pulley 11 and during such pivoting movement acts directly upon the retainer element 13 to lift the latter from the edge of the recess 14 that holds it, thereby shearing off the projection 26. The ejection arm 16 is, on the one hand, biased by a spring 17 into its pivoted-out position, and on the other hand, is held by the guide members 15 of the housing 10 over at least a predetermined angular range in the position in which it is pivoted into the recess 14.

In addition to the outlet opening 20 for the driving cable 12, which leads to a non-illustrated drive apparatus, the housing 10 is provided with a further opening 18, which like the outlet opening 20 enables the ejection arm 16 to pivot out and also makes available the necessary free space for the release of the retainer element 13 from the edge of the recess 14.

Starting from the position of the pulley 11 illustrated in FIG. 1 prior to the tensioning movement, the operation will be described in greater detail in the following. Upon triggering or initiation of the tensioning mechanism, as a consequence of the non-illustrated drive apparatus there is initially effected a movement of the driving cable 12 in the direction of the arrow 22 (FIG. 1), which leads to a counterclockwise rotation of the cable pulley 11 in the direction of the arrow 23. Due to the effect of the non-illustrated coupling, as the rotational movement of the pulley 11 begins the belt winding shaft 21 is coupled to the pulley 11, so that the belt winding shaft 21 is also rotated in the winding direction of the belt in the direction of the arrow 23. For the rotation of the belt winding shaft 21, a rotational range of about one-half to one-and-a-half rotations, or even more, of the cable pulley 11 can be provided.

Figure 2:
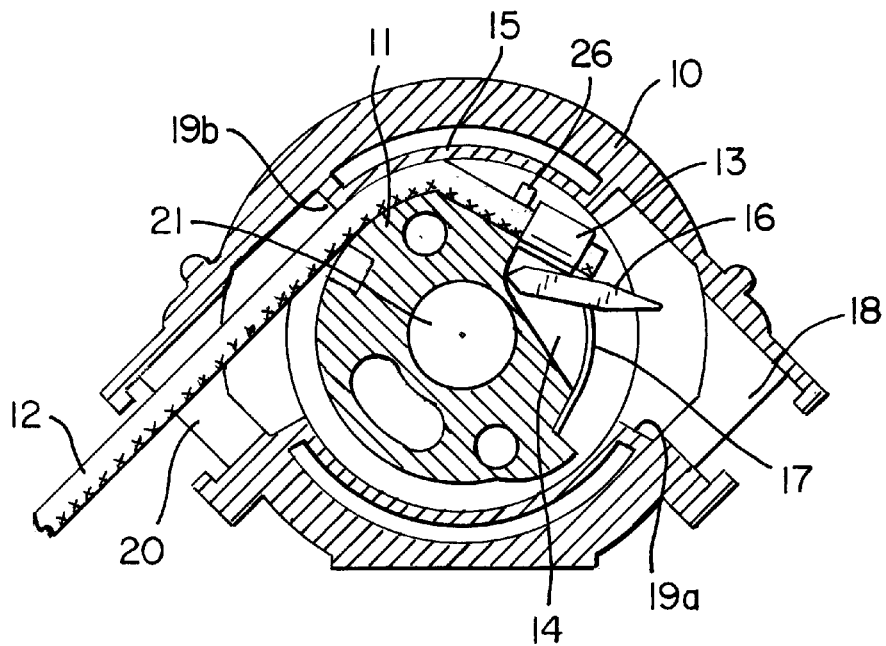
FIG. 2 shows the subject matter of FIG. 1 at the end of the tensioning process.

At the conclusion of the rotational movement of the pulley 11, this pulley has assumed the position illustrated in FIG. 2 in which the ejection arm 16 is disposed, for example, in front of the opening 18 in the housing 10, so that the spring 17 displaces the ejection arm 16 into the pivoted-out position in which the ejection arm projects beyond the periphery of the pulley 11. With this pivoting-out movement the ejection arm 16 comes into contact against the retainer element 13, although the force of the spring 17 is not sufficient for pressing the retainer element 13, which is under the tension of the taut driving cable 12, free from the edge of the recess 14.

Figure 3:
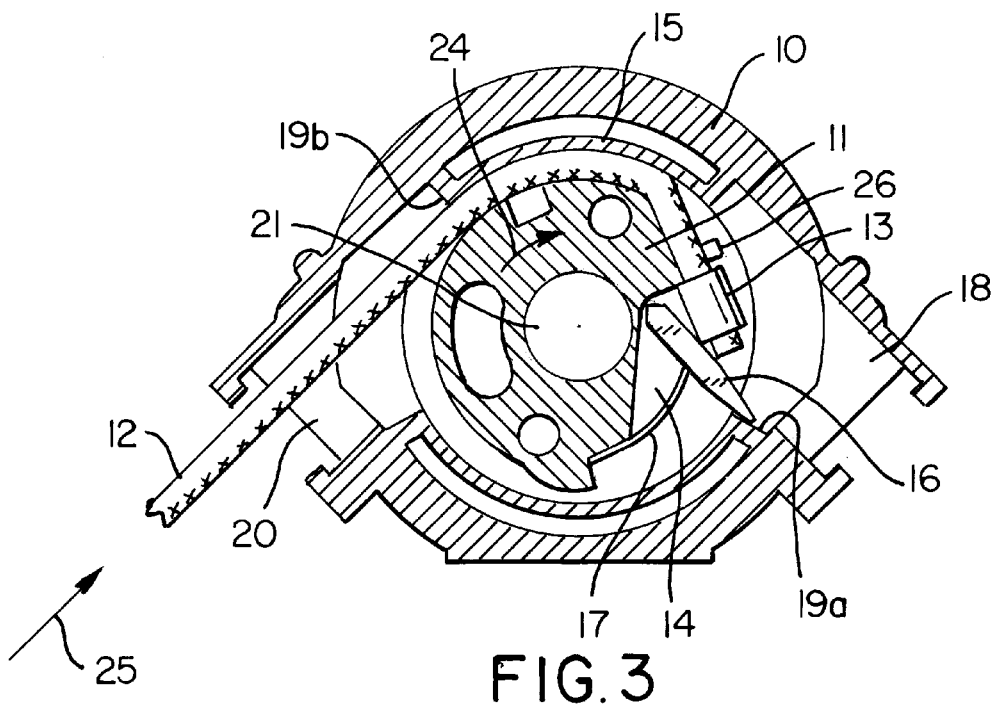
FIG. 3 shows the subject matter of FIG. 2 with the belt withdrawal being developed as a consequence of the force limitation.
Figure 4:
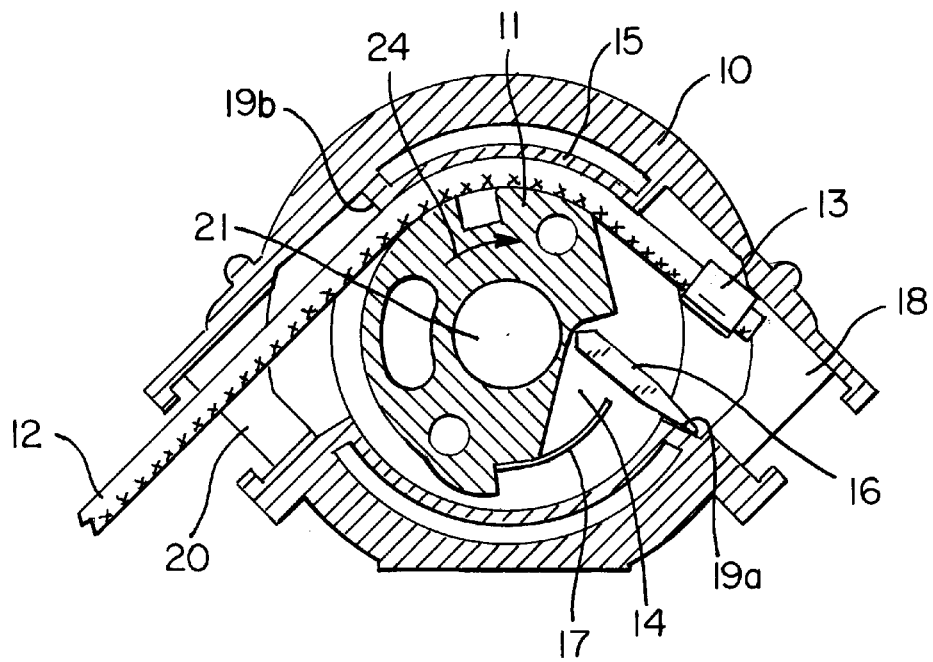
FIG. 4 shows the subject matter of FIG. 3 at the moment of the separation of the tensioning mechanism from the belt winding shaft.

If after the conclusion of the tensioning process the strapped-in passenger now exerts a force in the direction of belt withdrawal, which is indicated in FIG. 3 by the arrow 24, then due to the arrangement of the non-illustrated force-limiting device there results a rotation of the belt winding shaft 21 in the direction of the arrow 24, so that the ejection arm 16, which is now held in the radially pivoted-out position by the spring 17, comes to rest against that edge of the opening 18 in the housing 10 that acts as an abutment edge 19a. Upon further rotation of the belt winding shaft 21 in the belt withdrawal direction, during which the driving cable 12 is drawn into the housing 10 in the direction of the arrow 25, the abutment edge 19a again actively leads the ejection arm 16 outwardly, so that via the correspondingly exerted force the ejection arm 16 now displaces the retainer element 13 out of the recess 14 of the pulley 11, so that the retainer element 13 of the cable 12, which up to this point in time has been held by the projections 26, which shear off under stress, is released from the periphery of the pulley 11; in this way, the pulley 11 is uncoupled from the cable 12. In this position, the pulley 11, which continues to be coupled to the belt winding shaft 21, can rotate together with the belt winding shaft 21 in the belt withdrawal direction in an unobstructed manner, so that the force-limiting path that is made available with the force-limiting device can be fully utilized.

The openings 20 and 18 are disposed symmetrically relative to one another, as are the guide members 15, so that, for example also after conclusion of the tensioning process after a one-half rotation, the retainer element 13 is disposed in front of the opening 20, and in the event that the ejection arm 16 has pivoted out it is prevented from further rotation by the abutment edge 19b of the guide member 15 that is associated with the opening 20; also in this position, the retainer element 13 is released from abutment against the pulley 11.

The specification incorporates by reference the disclosure of German priority document 199 21 809.9 of May 11, 1999.

The present invention is, of course, in no way restricted to the specific disclosure of the specification and drawings, but also encompasses any modifications within the scope of the appended claims.

What I claim is:

1. In a safety belt winding device having a tensioning mechanism that acts on a belt winding shaft and that is provided with a drive means, wherein upon initiation said tensioning mechanism is adapted to be coupled via a tensioner coupling with said belt winding shaft, said belt winding device furthermore being provided with a force-limiting device for a predetermined belt withdrawal, wherein a connection between said belt winding shaft and said tensioning mechanism is adapted to be eliminated after conclusion of a tensioning movement acting in a winding direction of a belt, and wherein said tensioning mechanism has a driving cable that is adapted to be unwound from a cable pulley that is adapted to be coupled to said belt winding shaft, the improvement wherein said cable pulley is accommodated in a housing, wherein a retaining element is disposed on an end of said cable and is releasably fixed in position on said pulley, wherein an ejection arm is mounted on said pulley such that it can be pivoted out radially and that during a tensioning process in a belt winding direction is held in a pivoted-in position by said housing, whereupon during rotation of said belt winding shaft in a belt withdrawal direction, said ejection arm pivots outwardly and is fixed from further rotation via a configuration of said housing and thereby displaces said retainer element of said cable out of an engagement with said pulley.

2. A safety belt winding device according to claim 1, wherein said pulley is provided with a recess, wherein said retaining element of said cable hooks into said recess when retaining said cable, and wherein said ejection arm, which acts directly upon said retainer element during a pivoting-out movement, is disposed in said recess.

3. A safety belt winding device according to claim 2, wherein projections are provided for fixing an end portion of said cable in a position against said pulley, wherein said projections are adapted to be sheared off during said radial pivoting-out of said retainer element.

4. A safety belt winding device according to claim 3, wherein said projections are disposed on said cable.

5. A safety belt winding device according to claim 3, wherein a spring is provided for biasing said ejection arm in its radial pivoting-out direction.

6. A safety belt winding device according to claim 3, wherein said housing is provided with at least one opening that enables not only said radial pivoting-out movement of said ejection arm but also release of said retainer element from said recess of said pulley.

* * * * *